United States Patent
Dai et al.

(10) Patent No.: US 8,312,724 B2
(45) Date of Patent: Nov. 20, 2012

(54) MIXER ASSEMBLY FOR A GAS TURBINE ENGINE HAVING A PILOT MIXER WITH A CORNER FLAME STABILIZING RECIRCULATION ZONE

(75) Inventors: Zhongtao Dai, Manchester, CT (US);
Jeffrey M. Cohen, Hebron, CT (US);
Catalin G. Fotache, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/014,434

(22) Filed: Jan. 26, 2011

(65) Prior Publication Data
US 2012/0186258 A1    Jul. 26, 2012

(51) Int. Cl.
*F02C 1/00*    (2006.01)
(52) U.S. Cl. .................. 60/748; 60/737; 60/753
(58) Field of Classification Search .......... 60/737, 60/738, 746, 747, 748, 753
See application file for complete search history.

(56) References Cited

U.S. PATENT DOCUMENTS

| | | | |
|---|---|---|---|
| 5,220,786 A * | 6/1993 | Campbell | 60/753 |
| 5,623,827 A * | 4/1997 | Monty | 60/748 |
| 6,047,539 A * | 4/2000 | Farmer | 60/753 |
| 6,082,111 A | 7/2000 | Stokes | |
| 6,161,387 A | 12/2000 | Green | |
| 6,272,840 B1 | 8/2001 | Crocker et al. | |
| 6,354,072 B1 | 3/2002 | Hura | |
| 6,363,726 B1 | 4/2002 | Durbin et al. | |
| 6,367,262 B1 | 4/2002 | Mongia et al. | |
| 6,381,964 B1 * | 5/2002 | Pritchard et al. | 60/746 |
| 6,389,815 B1 | 5/2002 | Hura et al. | |
| 6,418,726 B1 * | 7/2002 | Foust et al. | 60/748 |
| 6,484,489 B1 | 11/2002 | Foust et al. | |
| 6,547,215 B2 | 4/2003 | Matsusaka et al. | |
| 6,560,967 B1 | 5/2003 | Cohen et al. | |
| 6,968,692 B2 | 11/2005 | Chin et al. | |
| 7,010,923 B2 | 3/2006 | Mancini et al. | |
| 7,013,635 B2 | 3/2006 | Cohen et al. | |
| 7,464,553 B2 | 12/2008 | Hsieh et al. | |
| 7,537,646 B2 | 5/2009 | Chen et al. | |
| 7,546,740 B2 | 6/2009 | Chen et al. | |
| 7,565,803 B2 | 7/2009 | Li et al. | |
| 7,581,396 B2 | 9/2009 | Hsieh et al. | |
| 7,621,131 B2 | 11/2009 | Von Der Bank | |
| 7,669,421 B2 | 3/2010 | Saitoh et al. | |
| 7,712,315 B2 | 5/2010 | Hautman et al. | |
| 7,779,636 B2 | 8/2010 | Buelow et al. | |
| 2004/0079085 A1 | 4/2004 | Mancini et al. | |
| 2005/0028526 A1 | 2/2005 | Von Der Bank | |
| 2006/0248898 A1 | 11/2006 | Buelow et al. | |
| 2007/0017224 A1 | 1/2007 | Li et al. | |

(Continued)

*Primary Examiner* — Ehud Gartenberg
*Assistant Examiner* — Lorne Meade
(74) *Attorney, Agent, or Firm* — Miller, Matthias & Hull LLP

(57) ABSTRACT

A mixer assembly for a gas turbine engine is provided, including a main mixer, and a pilot mixer having an annular housing in which a corner is formed between an aft portion of the housing and a bulkhead wall in which a corner recirculation zone is located to stabilize and anchor the flame of the pilot mixer. The pilot mixer can further include features to cool the annular housing, including in the area of the corner recirculation zone.

15 Claims, 5 Drawing Sheets

U.S. PATENT DOCUMENTS

| | | |
|---|---|---|
| 2007/0028617 A1 | 2/2007 | Hsieh et al. |
| 2007/0028618 A1* | 2/2007 | Hsiao et al. ................ 60/737 |
| 2007/0137207 A1 | 6/2007 | Mancini et al. |
| 2007/0163263 A1 | 7/2007 | Thomson |
| 2008/0072605 A1 | 3/2008 | Hagen et al. |
| 2008/0078181 A1 | 4/2008 | Mueller et al. |
| 2008/0302105 A1* | 12/2008 | Oda et al. .................. 60/737 |
| 2009/0113893 A1 | 5/2009 | Li et al. |
| 2009/0173076 A1 | 7/2009 | Toon |
| 2010/0050644 A1 | 3/2010 | Pidcock et al. |
| 2010/0115956 A1 | 5/2010 | Toon |
| 2010/0126177 A1 | 5/2010 | Hautman et al. |
| 2010/0162713 A1* | 7/2010 | Li et al. ...................... 60/748 |
| 2010/0263382 A1* | 10/2010 | Mancini et al. ............. 60/742 |
| 2010/0269506 A1 | 10/2010 | Nonaka et al. |
| 2010/0287946 A1 | 11/2010 | Buelow et al. |

* cited by examiner

MIXER ASSEMBLY FOR A GAS TURBINE ENGINE HAVING A PILOT MIXER WITH A CORNER FLAME STABILIZING RECIRCULATION ZONE

STATEMENT OF FEDERALLY SPONSORED RESEARCH OR DEVELOPMENT

This invention was made with Government support under Contract No. NNC08CA92C awarded by the National Aeronautics and Space Administration (NASA). The U.S. Government has certain rights in the invention.

CROSS REFERENCE TO RELATED APPLICATIONS

This application is related to co-pending, commonly-assigned U.S. patent application Ser. No. 13/014,388, entitled "MIXER ASSEMBLY FOR A GAS TURBINE ENGINE," filed on the date of filing of the present application, and is incorporated herein by reference in its entirety.

BACKGROUND OF THE INVENTION

The subject matter disclosed herein relates generally to combustors for gas turbine engines and more particularly to mixer assemblies for gas turbine engines.

Gas turbine engines, such as those used to power modern aircraft, to power sea vessels, to generate electrical power, and in industrial applications, include a compressor for pressurizing a supply of air, a combustor for burning a hydrocarbon fuel in the presence of the pressurized air, and a turbine for extracting energy from the resultant combustion gases. Generally, the compressor, combustor, and turbine are disposed about a central engine axis with the compressor disposed axially upstream or forward of the combustor and the turbine disposed axially downstream of the combustor. In operation of a gas turbine engine, fuel is injected into and combusted in the combustor with compressed air from the compressor thereby generating high-temperature combustion exhaust gases, which pass through the turbine and produce rotational shaft power. The shaft power is used to drive a compressor to provide air to the combustion process to generate the high energy gases. Additionally, the shaft power is used to, for example, drive a generator for producing electricity, or drive a fan to produce high momentum gases for producing thrust.

An exemplary combustor features an annular combustion chamber defined between a radially inboard liner and a radially outboard liner extending aft from a forward bulkhead wall. The radially outboard liner extends circumferentially about and is radially spaced from the inboard liner, with the combustion chamber extending fore to aft between the liners. A plurality of circumferentially distributed fuel injectors are mounted in the forward bulkhead wall and project into the forward end of the annular combustion chamber to supply the fuel to be combusted. Air swirlers proximate to the fuel injectors impart a swirl to inlet air entering the forward end of the combustion chamber at the bulkhead wall to provide rapid mixing of the fuel and inlet air.

Combustion of the hydrocarbon fuel in air in gas turbine engines inevitably produces emissions, such as oxides of nitrogen (NOx), carbon dioxide ($CO_2$) carbon monoxide (CO), unburned hydrocarbons (UHC), and smoke, which are delivered into the atmosphere in the exhaust gases from the gas turbine engine. Regulations limiting these emissions have become more stringent. At the same time, the engine pressure ratio is getting higher and higher for increasing engine efficiency, lowering specific fuel consumption, and lowering carbon dioxide ($CO_2$) emissions, resulting in significant challenges to designing combustors that still produce low emissions despite increased combustor inlet pressure, temperature, and fuel/air ratio. Due to the limitation of emission reduction potential for the rich burn, quick quench, lean burn (RQL) combustor, radially fuel staged lean burn combustors have become used more frequently for further reduction of emissions.

Mixer assemblies for existing radially fuel staged lean burn combustors typically include a pilot mixer surrounded by a main mixer with a fuel manifold provided between the two mixers to inject fuel radially into the cavity of the main mixer through fuel injection holes. The pilot mixer and the main mixer typically employ air swirlers to impart swirls to the air entering the mixers and to provide rapid mixing of the air and the fuel. One of the key issues associated with the development of radially fuel staged combustors is to improve the mixing in the main mixer without negatively impacting the performance of the pilot mixer at lower power operations, including combustion efficiency, emissions, stability, lean blow out, and combustor dynamics. For example, combustion air flowing from the main mixer can in some instances interact with the pilot mixer and blow out the flame in the pilot mixer causing a lean blow out. Similarly, if the stability of the pilot mixer is dependent upon the stabilization of the entire combustor, that can cause a lean blow out of the flame of the pilot mixer. Cool air from the main mixer during low power operations can also result in low flame temperatures in the combustor near the pilot mixer, increasing the potential for producing CO and UHC based on improper or incomplete combustion. In addition, another key design issue is to provide adequate cooling of the pilot mixer to avoid excessive heat that can damage the mixer assembly.

BRIEF SUMMARY OF THE INVENTION

A mixer assembly for a gas turbine engine is provided, including a main mixer, and a pilot mixer having an annular housing in which a corner is formed between an aft portion of the housing and a bulkhead wall in which a corner recirculation zone is located to stabilize and anchor the flame of the pilot mixer. The pilot mixer can further include features to cool the annular housing, including in the area of the corner recirculation zone.

According to one embodiment, a mixer assembly for a gas turbine engine is provided. The mixer assembly includes a main mixer and a pilot mixer concentrically arranged with the main mixer, wherein the main mixer surrounds at least a portion of the pilot mixer, the pilot mixer comprising an annular housing separating the pilot mixer from the main mixer and forming a cavity, wherein the annular housing has a forward portion and an aft portion and wherein the aft portion has a larger diameter than the forward portion, a fuel nozzle surrounded by the forward portion of the annular housing, and a bulkhead wall located downstream of the fuel nozzle and connecting the forward portion of the annular housing to the aft portion of the annular housing, wherein the bulkhead wall is substantially perpendicular to the aft portion of the annular housing forming a corner between the aft portion of the annular housing and the bulkhead wall.

In another embodiment, a mixer assembly for a gas turbine engine is provided. The mixer assembly includes a main mixer and a pilot mixer concentrically arranged with the main mixer, wherein the main mixer surrounds at least a portion of the pilot mixer, the pilot mixer comprising an annular housing separating the pilot mixer from the main mixer, wherein the annular housing has a forward portion and an aft portion and wherein the aft portion has a larger diameter than the forward portion, a bulkhead wall connecting the forward portion of the annular housing to the aft portion of the annular housing, wherein the bulkhead wall is substantially perpendicular to the aft portion of the annular housing, and a first plurality of holes extending longitudinally through the aft portion of the annular housing.

In yet another embodiment, a mixer assembly for a gas turbine engine is provided. The mixer assembly includes a main mixer and a pilot mixer concentrically arranged with the main mixer, wherein the main mixer surrounds at least a portion of the pilot mixer, the pilot mixer comprising an annular housing separating the pilot mixer from the main mixer, wherein the annular housing has a forward portion and an aft portion and wherein the aft portion has a larger diameter than the forward portion, a bulkhead wall connecting the forward portion of the annular housing to the aft portion of the annular housing, wherein the bulkhead wall is substantially perpendicular to the aft portion of the annular housing, a forward wall upstream of the forward surface of the bulkhead wall connecting the forward portion of the annular housing and the aft portion of the annular housing, wherein a space is formed between the forward wall and the bulkhead wall, and a first plurality of holes circumferentially distributed in, and extending transversally through, the forward wall.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
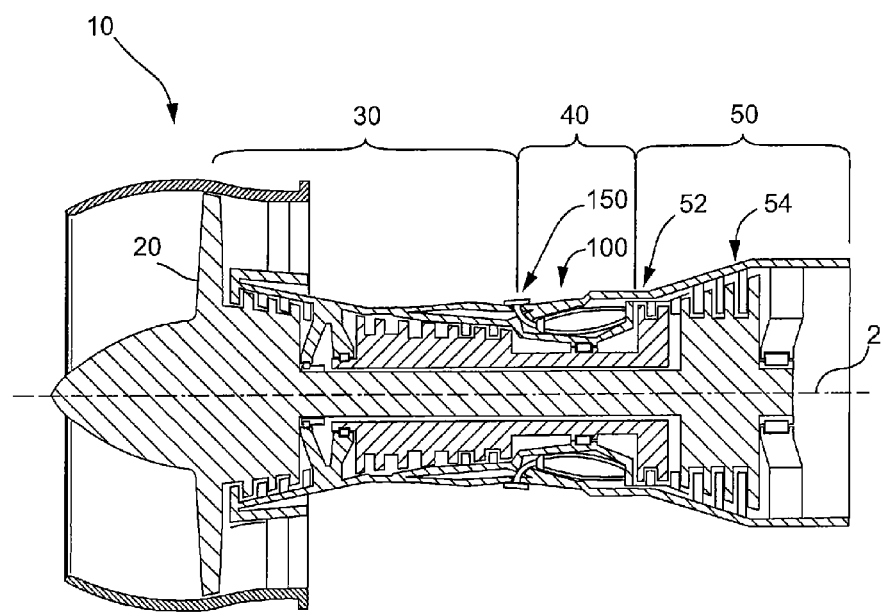
FIG. 1 is a schematic diagram of an exemplary embodiment of a gas turbine engine.

FIG. 1 is a schematic diagram of an exemplary embodiment of a gas turbine engine 10. The gas turbine engine 10 is depicted as a turbofan that incorporates a fan section 20, a compressor section 30, a combustion section 40, and a turbine section 50. The combustion section 40 incorporates a combustor 100 that includes a plurality of fuel injectors 150 that are positioned annularly about a centerline 2 of the engine 10 upstream of the turbines 52, 54. Throughout the application, the terms "forward" or "upstream" are used to refer to directions and positions located axially closer toward a fuel/air intake side of a combustion system than directions and positions referenced as "aft" or "downstream." The fuel injectors 150 are inserted into and provide fuel to one or more combustion chambers for mixing and/or ignition. It is to be understood that the combustor 100 and fuel injector 150 as disclosed herein are not limited in application to the depicted embodiment of a gas turbine engine 10, but are applicable to other types of gas turbine engines, such as those used to power modern aircraft, to power sea vessels, to generate electrical power, and in industrial applications.

Figure 2:
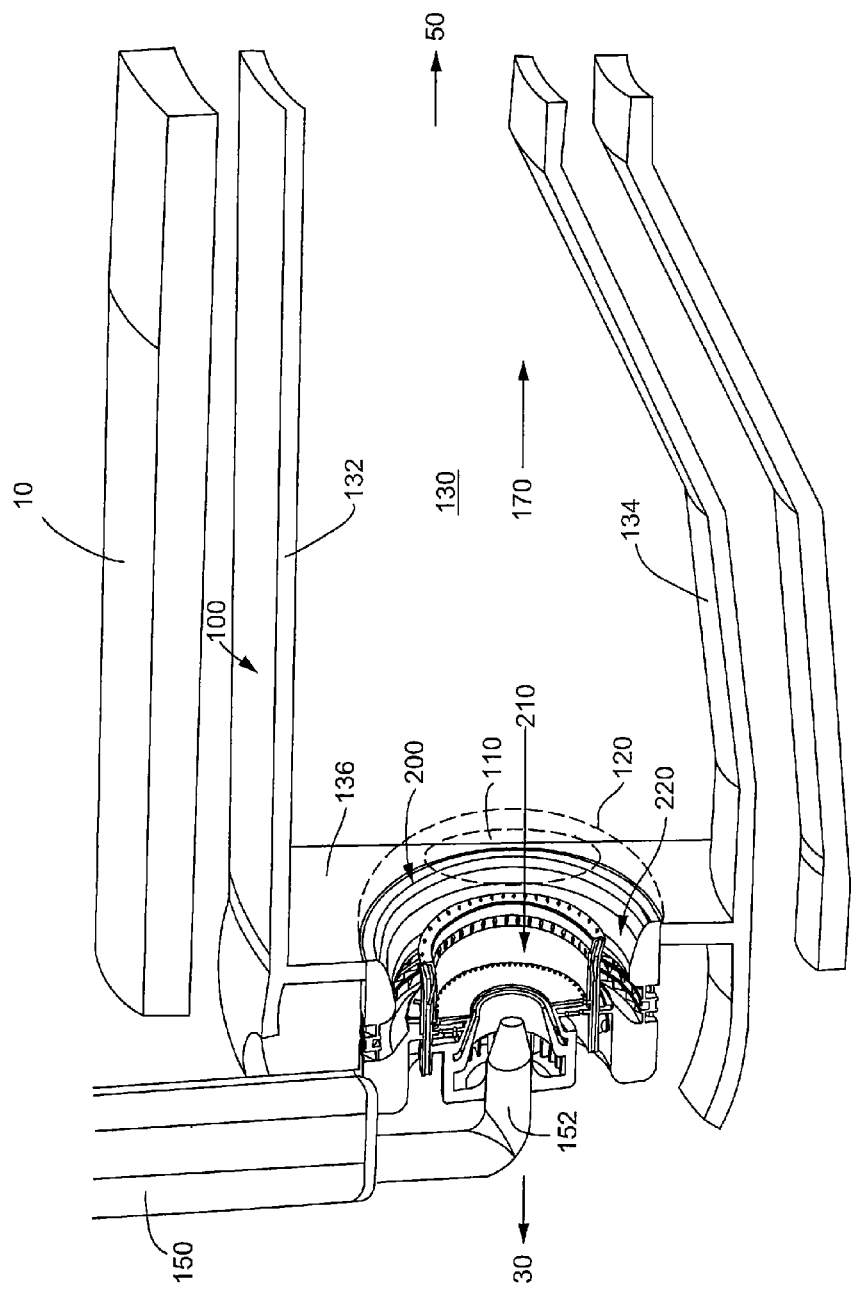
FIG. 2 is a partial perspective view of an exemplary embodiment of a combustor of a gas turbine engine.

FIG. 2 is a partial perspective view of an exemplary embodiment of a combustor 100 of a gas turbine engine 10. The combustor 100 is positioned between the compressor section 30 and the turbine section 50 of a gas turbine engine 10. The exemplary combustor 100 includes an annular combustion chamber 130 bounded by an inner (inboard) wall 134 and an outer (outboard) wall 132 and a forward bulkhead wall 136 spanning between the walls 132, 134 at the forward end of the combustor 100. The bulkhead wall 136 of the combustor 100 carries a plurality of mixer assemblies 200, including the fuel nozzle 152 of a fuel injector 150, a main mixer 220, and a pilot mixer 210. It will be understood that, although only a single mixer assembly 200 is shown in FIG. 2 for illustrative purposes, the combustor 100 may include a plurality of mixer assemblies 200 circumferentially distributed and mounted at the forward end of the combustor 100. A number of sparkplugs (not shown) are positioned with their working ends along a forward portion of the combustion chamber 130 to initiate combustion of the fuel and air mixture. The combusting mixture is driven downstream within the combustor 100 along a principal flowpath 170 toward the turbine section 50 of the engine 10. The fuel and air provided to the pilot mixer 210 produce a primary combustion zone 110 within a central portion of the combustion chamber 130. The fuel and air provided to the main mixer 220 produce a secondary combustion zone 120 in the combustion chamber 130 that is radially outwardly spaced from and concentrically surrounds the primary combustion zone 110.

Figure 3:
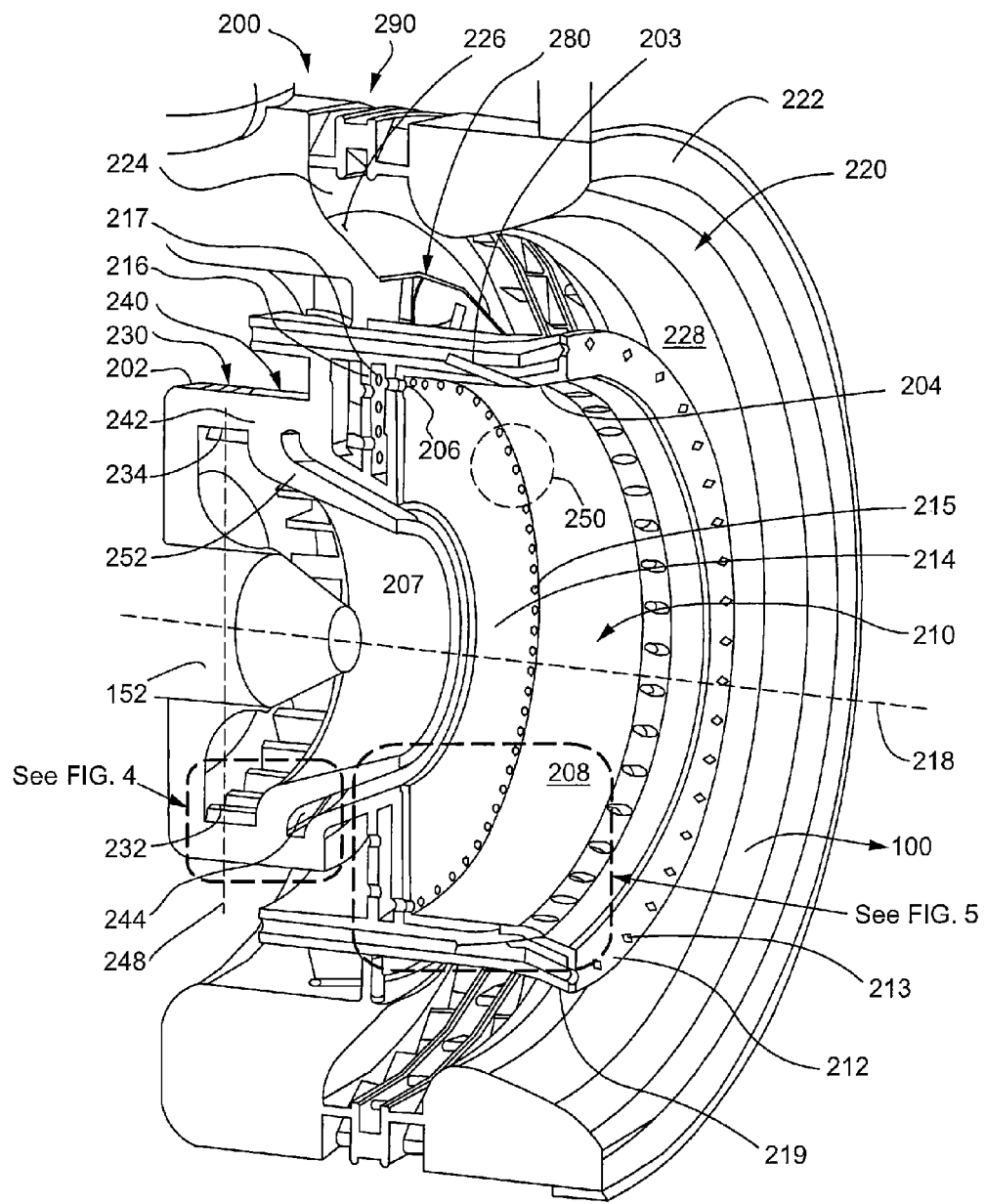
FIG. 3 is an enlarged partial perspective view of an exemplary embodiment of a mixer assembly for the exemplary combustor of FIG. 2.

FIG. 3 is an enlarged partial perspective view of an exemplary embodiment of the mixer assembly 200 for the exemplary combustor 100 of FIG. 2. The exemplary mixer assembly 200 includes a main mixer 220 and a pilot mixer 210. The pilot mixer 210 and the main mixer 220 are concentrically arranged with the pilot mixer 210 located in the center of the main mixer 220, which surrounds a portion of the pilot mixer 210. The mixer assembly 200 has a centerline axis 218. The pilot mixer 210 includes an annular pilot mixer housing 212 separating and sheltering the pilot mixer 210 from the main mixer 220 and forming the pilot mixer cavity 208. The pilot mixer housing 212 has a forward portion 202 and an aft portion 204, with the aft portion 204 having a larger diameter than the forward portion 202. The forward portion 202 of the annular pilot mixer housing 212 surrounds a portion of the fuel nozzle 152. The forward portion 202 and the aft portion 204 of the annular pilot mixer housing 212 are connected by a pilot mixer bulkhead wall 214 downstream of the fuel nozzle 152 and substantially perpendicular to the aft portion 204 of the annular pilot mixer housing 212, forming a corner 206 between the aft portion 204 of the annular pilot mixer housing 212 and the pilot mixer bulkhead wall 214. The main mixer 220 further includes an annular main mixer outer radial wall 222 radially surrounding a portion of the annular pilot mixer housing 212, the outer surface of which forms an annular main mixer inner radial wall 219, and a main mixer forward wall 224 substantially perpendicular to and connecting the annular main mixer outer radial wall 222 and the annular main mixer inner radial wall 219, forming a main mixer annular cavity 228. The annular main mixer outer radial wall 222 further incorporates a plurality of radial swirlers 290, while the main mixer forward wall 224 further incorporates an axial swirler 280 and a plurality of fuel injection holes 226 circumferentially distributed between the radial swirlers 290 and the axial swirler 280 around the main mixer forward wall 224. The fuel injection holes 226 are in flow communication with a fuel manifold (not shown), which in turn is in flow communication with a fuel supply. The fuel nozzle 152 dispenses fuel within the pilot mixer cavity 208. Although described with respect to liquid fuel, the exemplary embodiments of mixer assemblies 200 can also be used with gaseous fuel or partially vaporized fuel.

The forward portion 202 of the annular pilot mixer housing 210 incorporates a first swirler 230 radially surrounding a portion of the fuel nozzle 152 and located upstream of the pilot mixer bulkhead wall 214. Adjacent to and downstream of the first swirler 230, the forward portion 202 of the annular pilot mixer housing 210 incorporates a second swirler 240 radially surrounding a portion of the fuel nozzle 152 and located upstream of the pilot mixer bulkhead wall 214. The first swirler 230 and the second swirler 240 each have an axis 248 oriented substantially radially to the centerline axis 218 of the mixer assembly 200. A swirler inner cone 252 separates the first swirler 230 and the second swirler 240. In one embodiment, the fuel/air mixture flowing from the pilot mixer 210 is co-rotating with the fuel/air mixture flowing from the main mixer 220 helping, along with the aft portion 204 of the annular pilot mixer housing 212, to minimize undesired mixing between the two airstreams, especially at low power operations where the cold air from the main mixer 220 may blow out the flame of the pilot mixer 210.

Figure 4:
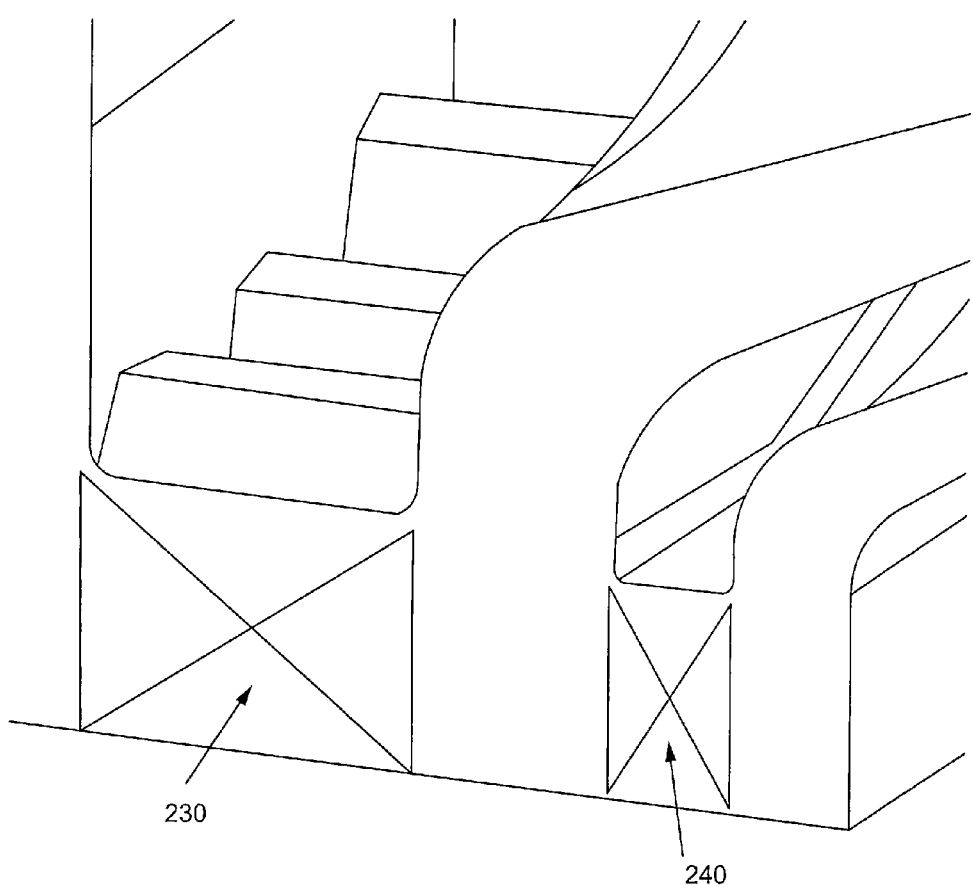
FIG. 4 is an enlarged localized view of the first swirler and the second swirler of the pilot mixer assembly for the exemplary combustor of FIG. 2.

As can been seen in FIG. 3 and FIG. 4, the first swirler 230 is significantly wider than the second swirler 240. The first and second swirlers 230 and 240 each have a plurality of vanes for swirling air traveling through the swirlers to mix the air and the fuel dispensed by the fuel nozzle 152. The first swirler 230 includes a first plurality of vanes 232 forming a first plurality of air passages 234 between the vanes 232. The vanes 232 are oriented at a first angle with respect to axis 248 to cause the air to rotate in the pilot mixer cavity 208 in a first direction (e.g., clockwise). The second swirler 240 includes a second plurality of vanes 242 forming a second plurality of air passages 244 between the vanes 242. The vanes 242 are oriented at a second angle with respect to axis 248 to cause the air to rotate in the pilot mixer cavity 208 in the first direction (e.g., clockwise) but at a different angle. Having different angles for the two swirlers 230, 240 causes high shear and helps atomize and disperse the fuel film that forms on the swirler inner cone 252. The fuel film is sheared between swirling airstreams, breaking up the fuel film into small droplets because of the shear and instability in the film, thereby producing fine droplets. The configuration of the vanes in the swirlers may be altered to vary the swirl direction of air flowing and are not limited to the exemplary swirl directions indicated.

Once atomized and dispersed, the fuel and air mixture is ignited and forms a corner recirculation zone 250 recessed in the pilot mixer cavity 208 in the corner 206 between the aft portion 204 of the annular pilot mixer housing 212 and the pilot mixer bulkhead wall 214. This corner recirculation zone 250, which is effectively sheltered from the main mixer 220 by the aft portion 204 of the annular pilot mixer housing 212, is formed by the rapidly expanding air flowing from the narrow second swirler 240, which seeks to spread out quickly to the corner 206 within the pilot mixer cavity 208. This corner recirculation zone 250 effectively recirculates hot products in the corner 206 of the pilot mixer cavity 208 to maintain the stability of the pilot mixer 210 independently of the rest of the combustor 100, creating a self-sustaining source of hot gas with better anchoring and protection of the flame of the pilot mixer 210. The corner recirculation zone 250 allows for significant to complete combustion of the fuel before it leaves the annular pilot mixer housing 212 of the pilot mixer 210 and enters the combustion chamber 130 (see FIG. 2), minimizing the potential for producing CO and UHC based on improper or incomplete combustion. So while the center recirculation zone of the combustor 100 helps to stabilize the pilot mixer 210, the pilot mixer 210 has its own separate and independent source of stability.

Figure 5:
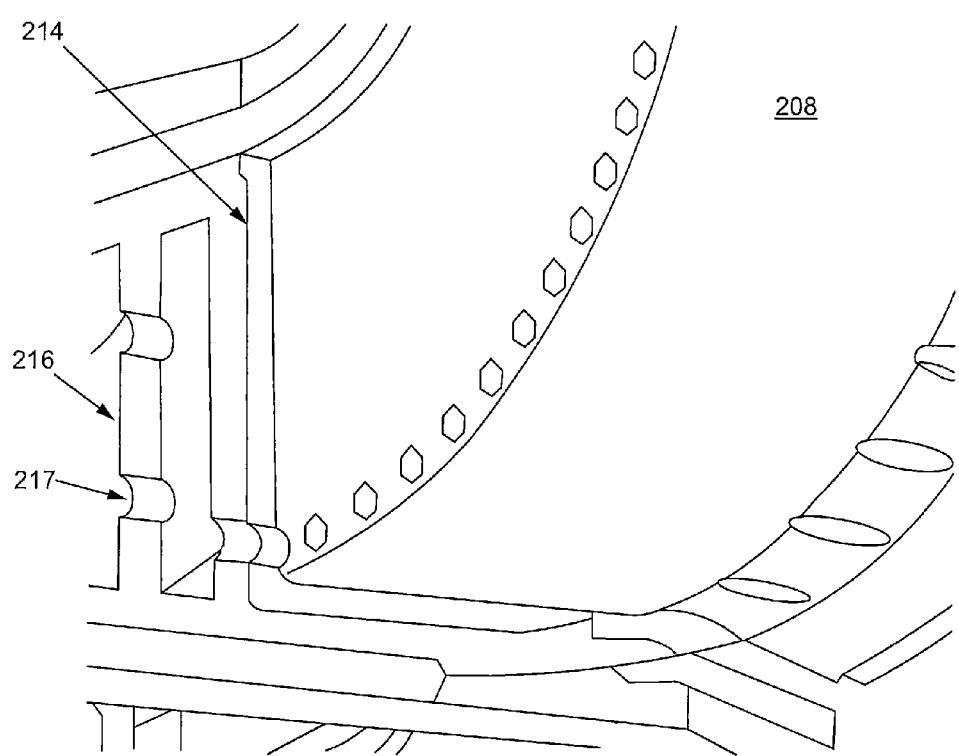
FIG. 5 is an enlarged localized view of thermal barrier coating on the downstream surface of the bulkhead wall and the inner surface of the annular pilot mixer housing of the pilot mixer assembly for the exemplary combustor of FIG. 2.

Returning to FIG. 3, in order to protect the pilot mixer 210, and in particular the corner 206 of the annular housing 202 where the corner recirculation zone 250 is located, from excessive heat, the inner surface of the aft portion 204 of the annular pilot mixer housing 212 and the downstream surface of the pilot mixer bulkhead wall 214 are coated with a thermal barrier coating (see FIG. 5). The outer surface of the aft portion 204 of the annular pilot mixer housing 212, which forms an annular main mixer inner radial wall 219, is also cooled by the high velocity and turbulent intensity airflow through the main mixer annular cavity 228, providing backside convective cooling. In addition, a first plurality of holes 213 are circumferentially distributed in, and extend longitudinally through the aft portion 204 of the annular pilot mixer housing 212 through which cool air passes to cool the annular pilot mixer housing 212, providing further cooling. The tip of the annular pilot mixer housing 212 is also cooled by the cool air flowing from the first plurality of holes 213 extending longitudinally through the aft portion 204 of the annular pilot mixer housing 212. The cool air flowing through the longitudinal holes 213 also flows through passages 203 extending from the holes 213 to the inner surface of the aft portion 204 of the annular pilot mixer housing 212, providing effusion cooling of the annular pilot mixer housing 212. The pilot mixer 210 has a pilot mixer forward wall 216 upstream of the forward surface of the pilot mixer bulkhead wall 214, also connecting the forward portion 202 and the aft portion 204 of the annular pilot mixer housing 212. A space 207 is formed between the pilot mixer forward wall 216 and the forward surface of the pilot mixer bulkhead wall 214. A second plurality of holes 217 are circumferentially distributed in, and extend transversally through, the pilot mixer forward wall 216 through which cool air passes to cool the forward surface of the pilot mixer bulkhead wall 214, providing backside impingement cooling of the annular pilot mixer housing 212. A third plurality of holes 215 are also circumferentially distributed in, and extend transversally through, the pilot mixer bulkhead wall 214 proximate the inner surface of the aft portion 204 of the annular pilot mixer housing 212 through which at least a portion of the air passing through the second plurality of holes 217 in the pilot mixer forward wall 216 also passes through the holes 215 to provide film cooling of the inner surface of the housing 212.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention. Therefore, it is intended that the present disclosure not be limited to the particular embodiment(s) disclosed as, but that the disclosure will include all embodiments falling within the scope of the appended claims.

We claim:

1. A mixer assembly for a gas turbine engine comprising:
a main mixer; and
a pilot mixer concentrically arranged with the main mixer, wherein the main mixer surrounds at least a portion of the pilot mixer, the pilot mixer comprising
an annular housing separating the pilot mixer from the main mixer and forming a cavity, wherein the annular housing has a forward portion and an aft portion and wherein the aft portion has a larger diameter than the forward portion, a downstream end of the aft portion having an annular endplate;
a first circumferential set of longitudinal holes extending through the aft portion and the annular endplate;
a fuel nozzle surrounded by the forward portion of the annular housing;
a bulkhead wall located downstream of the fuel nozzle and upstream and radially inward of the annular endplate, the bulkhead wall connecting a radially outer surface of the forward portion of the annular housing to a radially inner surface of the aft portion of the annular housing, wherein the bulkhead wall is substantially perpendicular to the aft portion of the annular housing forming a corner between the aft portion of the annular housing and the bulkhead wall; and
a second circumferential set of longitudinal holes distributed in and extending transversally through the bulkhead wall proximate the inner surface of the aft portion of the annular housing.

2. The mixer assembly of claim 1, wherein the forward portion of the annular housing further comprises:
a first swirler surrounding at least a portion of the fuel nozzle and located upstream of the bulkhead wall;
a second swirler adjacent to and downstream of the first swirler surrounding at least a portion of the fuel nozzle and located upstream of the bulkhead wall; and
a swirler inner cone separating the first swirler and the second swirler.

3. The mixer assembly of claim 2, wherein the first swirler further comprises
a first plurality of vanes forming a first plurality of air passages, wherein the first plurality of vanes are oriented at a first angle with respect to an axis of the first swirler; and
the second swirler further comprises a second plurality of vanes forming a second plurality of air passages, wherein the second plurality of vanes are oriented at a second angle with respect to an axis of the second swirler.

4. The mixer assembly of claim 3, wherein the axis of the first swirler is the same as the axis of the second swirler, and the axes are oriented substantially radially to a centerline axis of the mixer assembly.

5. The mixer assembly of claim 3, wherein the first angle is different from the second angle.

6. The mixer assembly of claim 1, further comprising a thermal barrier coating on the radially inner surface of the aft portion of the annular housing.

7. The mixer assembly of claim 1, further comprising a thermal barrier coating on a downstream surface of the bulkhead wall.

8. The mixer assembly of claim 1, further comprising a plurality of passages extending from the radially inner surface of the aft portion of the annular housing to the first circumferential set of longitudinal holes.

9. The mixer assembly of claim 1, further comprising: a forward wall upstream of a forward surface of the bulkhead wall connecting the forward portion of the annular housing and the aft portion of the annular housing, wherein a space is formed between the forward wall and the bulkhead wall; and
a plurality of holes circumferentially distributed in, and extending transversally through, the forward wall.

10. A mixer assembly for a gas turbine engine comprising:
a main mixer; and
a pilot mixer concentrically arranged with the main mixer, wherein the main mixer surrounds at least a portion of the pilot mixer, the pilot mixer comprising
an annular housing separating the pilot mixer from the main mixer, wherein the annular housing has a forward portion and an aft portion and wherein the aft portion has a larger diameter than the forward portion, a downstream end of the aft portion having an annular endplate;
a bulkhead wall located upstream and radially inward of the annular endplate, the bulkhead wall connecting a radially outer surface of the forward portion of the annular housing to a radially inner surface of the aft portion of the annular housing, wherein the bulkhead wall is substantially perpendicular to the aft portion of the annular housing;
a first circumferential set of longitudinal holes extending through the aft portion and the annular endplate of the annular housing;
a second circumferential set of longitudinal holes distributed in and extending transversally through the bulkhead wall proximate the inner surface of the aft portion of the annular housing; and
a plurality of passages extending from the radially inner surface of the aft portion of the annular housing to the first circumferential set of longitudinal holes.

11. The mixer assembly of claim 10, further comprising a thermal barrier coating on the radially inner surface of the aft portion of the annular housing.

12. The mixer assembly of claim 10, further comprising a thermal barrier coating on a downstream surface of the bulkhead wall.

13. The mixer assembly of claim 10, further comprising:
a forward wall upstream of a forward surface of the bulkhead wall connecting the forward portion of the annular housing and the aft portion of the annular housing, wherein a space is formed between the forward wall and the bulkhead wall; and
a plurality of holes circumferentially distributed in, and extending transversally through, the forward wall.

14. A mixer assembly for a gas turbine engine comprising:
a main mixer; and
a pilot mixer concentrically arranged with the main mixer, wherein the main mixer surrounds at least a portion of the pilot mixer, the pilot mixer comprising
an annular housing separating the pilot mixer from the main mixer, wherein the annular housing has a forward portion and an aft portion and wherein the aft portion has a larger diameter than the forward portion, a downstream end of the aft portion having an annular endplate;
a bulkhead wall located upstream and radially inward of the annular endplate, the bulkhead wall connecting a radially outer surface of the forward portion of the annular housing to a radially inner surface of the aft portion of the annular housing, wherein the bulkhead wall is substantially perpendicular to the aft portion of the annular housing, the bulkhead wall and the annular endplate each having a circumferential set of longitudinal holes;
a forward wall upstream of a forward surface of the bulkhead wall connecting the forward portion of the annular housing and the aft portion of the annular housing, wherein a space is formed between the forward wall and the bulkhead wall; and a plurality of holes circumferentially distributed in, and extending transversally through, the forward wall.

15. The mixer assembly of claim 14, wherein the circumferential set of longitudinal holes in the bulkhead wall are proximate to the radially inner surface of the aft portion of the annular housing.

* * * * *